SEMICONDUCTOR PROTECTION SYSTEM

Filed Nov. 14, 1967 2 Sheets-Sheet 1

Inventor
THEODORE N. TAHMISIAN Jr.
DANIEL J MAHONEY
BY Mueller, Aichele & Rauner
ATTYS.

May 5, 1970 T. N. TAHMISIAN, JR., ET AL 3,510,790

SEMICONDUCTOR PROTECTION SYSTEM

Filed Nov. 14, 1967 2 Sheets-Sheet 2

Inventor
THEODORE N. TAHMISIAN Jr.
DANIEL J. MAHONEY
BY Mueller, Aichele & Rauner
ATTYS.

3,510,790
SEMICONDUCTOR PROTECTION SYSTEM

Theodore N. Tahmisian, Jr., Oak Lawn, and Daniel J. Mahoney, Elgin, Ill., assignors to Motorola, Inc., Franklin Park, Ill., a corporation of Illinois Filed Nov. 14, 1967, Ser. No. 682,772
Int. Cl. H03f *21/00, 3/18*
U.S. Cl. 330—11 11 Claims

ABSTRACT OF THE DISCLOSURE

A protection system for a transmitter using transistors in the final power amplifier stage incorporates a protection circuit coupling the power supply to an amplifier stage and a directional coupler to measure power reflected from the antenna. The directional coupler is coupled to the protection circuit and provides a control signal proportional to the reflected power. The protection circuit is responsive to a control signal above a predetermined magnitude to disconnect the amplifier from the power supply and also to generate a pulsating signal. The pulsating signal is reproduced as an audible alarm signal.

Background of the invention

The development of transistors and other semiconductor components has made possible a reduction in the size and power consumption of electronic devices. In high powered transistorized transmitters it is often necessary to operate the output stages at or near the maximum rating of the transistors used in order to obtain maximum power output. When some fault occurs in the transmitter, such as the removal or grounding of the antenna, the resulting mismatch caused by this condition will reflect power back to the power output transistors causing an increase in the voltage across these transistors which may damage or destroy them. Therefor, the transmitter is normally provided with a protection circuit to prevent the build-up of excessive voltages which can cause such destruction.

Where the protection circuit operates to disconnect a portion of the transmitter from its power supply, the transmitter will be inoperative without the operator being aware that a faulty condition exists. Thus, the operator will be unable to communicate as desired and will not be aware of the failure.

Summary

It is, therefore, an object of this invention to provide an improved protection circuit for a transistorized transmitter.

Another object of this invention is to provide a protection circuit for a transistorized transmitter wherein the protection circuit gives an audible alarm signal when it is in operation.

Another object of this invention is to provide a protection circuit wherein interfering sidebands are not generated as the transmitter is turned on and off.

In practicing this invention a protection circuit is provided coupling the power supply to a transmitter amplifier stage. The final power amplifier stages of the transmitter are connected to an antenna through a directional coupler. The directional coupler is coupled to the protective circuit and is responsive to reflected power to develop a control signal proportional to the reflected power. When the control signal from the directional coupler increases above a pretermined magnitude, the protection circuit acts to disconnect the amplifier stage from the power supply for a particular time period. At the end of this time period the power supply is again connected to the amplifier stage. If the high VSWR condition still exists, the transmitter protection circuit again acts to disconnect the power supply from the amplifier stage. This alternate connection and disconnection is at a slow rate to prevent the development of interfering signals. The protection circuit also develops a periodic signal which is coupled to audio stages for reproduction thereby to give the transmitter operator warning of the operation of the protection circuit.

The invention is illustrated in the drawings of which:

Description of the invention

Figure 1:
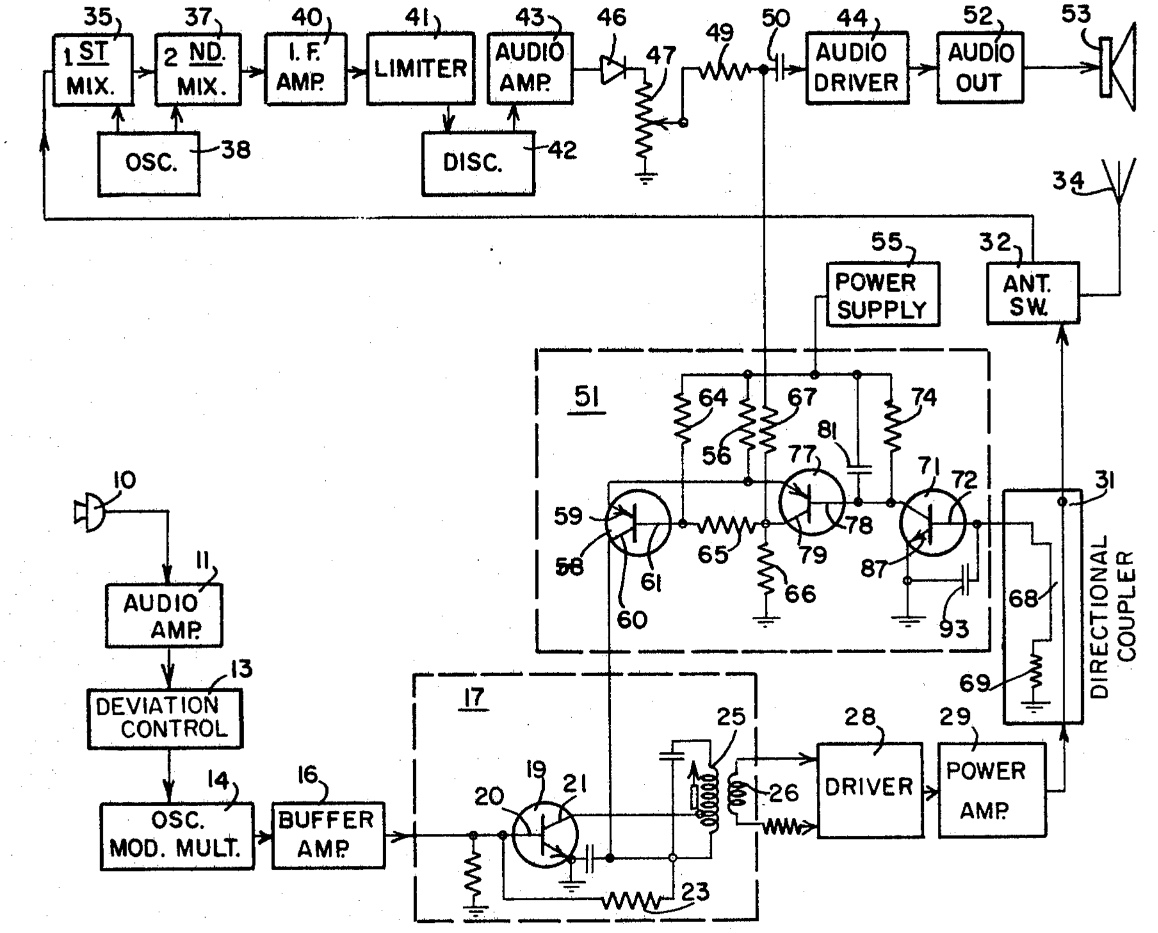
FIG. 1 is a partial schematic and partial block diagram of a schematic of a transmitter and receiver incorporating the features of this invention.

Referring to FIG. 1, there is shown a transmitter and receiver which incorporate the features of this invention. In the transmitter, microphone 10 receives audio signals which are amplified in audio amplifier 11 and coupled to the oscillator modulator multiplier circuit 14 through instantaneous deviation control circuit 13. The modulated output signal is amplified in buffer amplifier 16 and further amplified in amplifier 17, driver amplifier 28 and power amplifier 29. The output of power amplifier 29 is coupled to antenna switch 32 through directional coupler 31. Antenna switch 32 connects either the receiver portion or transmitter portion to antenna 34 as required.

Input signals received by antenna 34 are coupled by antenna switch 32 to first mixer 35. The output of first mixer 35 is coupled to a second mixer 37. Oscillator 38 provides the proper local oscillator signals for the first and second mixers 35 and 37.

The output of second mixer 37 is coupled to IF amplifier 40 and limiter 41. The output of limiter 41 is coupled to discriminator 42 to develop an amplitude modulated audio signal. The output of discriminator 42 is coupled to audio amplifier 43. The output of audio amplifier 43 is coupled to audio driver 44 through diode 46, volume control potentiometer 47, resistor 49 and capacitor 50. The audio signals are further amplified in audio output amplifier 52 and are audibly reproduced by speaker 53.

Power supply 55 is coupled to amplifier 17 through protection circuit 51. The current from power supply 55 flows through resistor 56, emitter 59, and collector 60 of normally conducting transistor 58 and through output transformer coil 25, to collector 21 of transistor 19. The current for biasing base 20 of transistor 19 is provided through resistor 23. Transistor 58 is biased to conduction by bias current supplied through resistors 56, 64, 65 and 66. Transistors 71 and 77 are normally biased to non-conduction.

Directional coupler 31 consists of a strip line 68 and a resistor 69. The operation of this directional coupler will be explained in a subsequent portion of this specification. The directional coupler 31 is responsive only to the reflected power from the antenna 34 to develop a control signal which is coupled to base 72 of transistor 71. When the control signal appearing on base 72 reaches a predetermined magnitude, transistor 71 is biased to conduction and current flows through resistor 74 and transistor 71 to ground. The resulting voltage drop across resistor 74 is supplied to base 78 of transistor 77 biasing transistor 77 to conduction. With transistor 77 biased to conduction the increased voltage drop across resistor 56 biases transistor 58 to non-conduction and current is no longer supplied to transistor 19 of amplifier 17 from power supply 55. With the disconnection of the power supply to amplifier 17, the output signal from power amplifier 29 is stopped, the control signal from directional coupler 31 ceases and transistor 71 is again biased to non-conduction.

During the time that transistor 71 is biased to conduction, capacitor 81 charges so that a voltage is developed across the capacitor to continue to bias transistor 77 to conduction. With transistor 71 non-conducting the charge on capacitor 81 discharges through the conducting transistor 77 and resistors 74 and 56 to maintain transistor 58 in a non-conducting state. When the charge on capacitor 81 has been reduced sufficiently, transistor 77 becomes non-conductive and transistor 58 again conducts to provide power to amplifier 17.

With power again supplied to amplifier 17 an output signal is developed in power amplifier 29 which is coupled to antenna 34 through directional coupler 31 and antenna switch 32. If the fault giving rise to the high reflected power condition is still present, the cycle of operation repeats itself with the protection circuit alternately connecting and disconnecting amplifier 17 from power supply 55. The rate at which this alternate action occurs is determined by the time constant of capacitor 81 and resistors 74 and 56 and transistor 77.

With transistor 77 conducting, the flow of current through resistor 66 increases and the voltage on collector 79 of transistor 77 rises. When transistor 77 ceases conducting, the voltage on collector 79 falls. The values of capacitor 81 and resistors 56, 74 and 71 are chosen so that the protection circuit 51 turns on and off at a slow rate.

As the transmitter is turned on and off, undesirable sideband signals are developed which are a function of sin $x/x$. In order to meet the FCC requirements for communication transmitters, these spurious sideband signals must be limited. It has been found that the sideband signals can be limited to meet the FCC requirements by using a repetition rate of turn-off and turn-on of 200 cycles per second or less. In an example of a transmitter incorporating the features of this invention, the transmitter turns on and off at a rate of 2 cycles per second. The rate of turn-on and turn-off is not limited to the above repetition rates, however, and can be any rate which will meet the FCC requirements for the particular application.

The voltage developed across resistor 66 is coupled to audio driver 44 through capacitor 50 and resistor 67. These pulses are amplified in audio driver 44, further amplified in audio amplifier 52 and reproduced by speaker 53. Thus the operation of the protection circuit 51 produces an alarm signal from speaker 53 so that the operator of the transmitter is aware that a condition exists which requires the operation of the protection circuit. While FIG. 1 shows a receiver and transmitter circuit, the invention does not require a receiver circuit but only an audio output circuit which will reproduce the audio signal developed across resistor 66.

Figure 2:
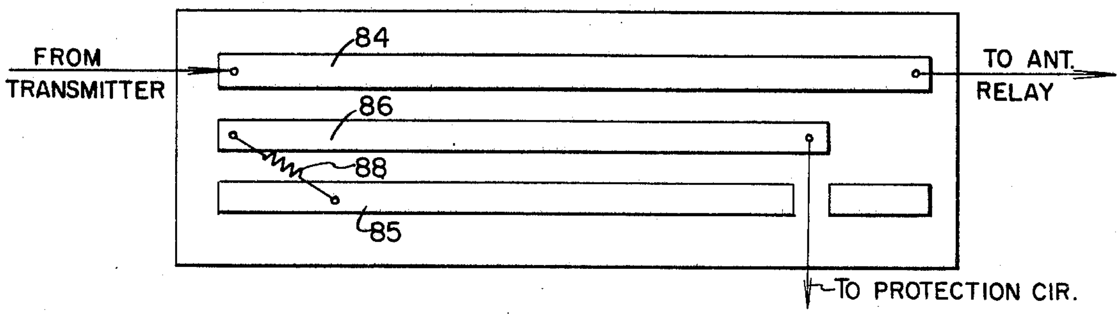
FIG. 2 is a drawing of an improved directional coupler useful with this invention.

In FIG. 2 there is shown the directional coupler 31 of FIG. 1. The directional coupler consists of a strip line structure which may be formed on a printed wiring board. The strip line construction consists of the conductor 84 coupling the transmitter to the antenna relay, a ground plane 85 and a center conductor 86. One end of the center conductor 86 is coupled to the ground plane through resistor 88 which corresponds to resistor 69 of FIG. 1. The other end of center conductor 86 is coupled to base 72 of transistor 71 shown in FIG. 1.

Figure 3:
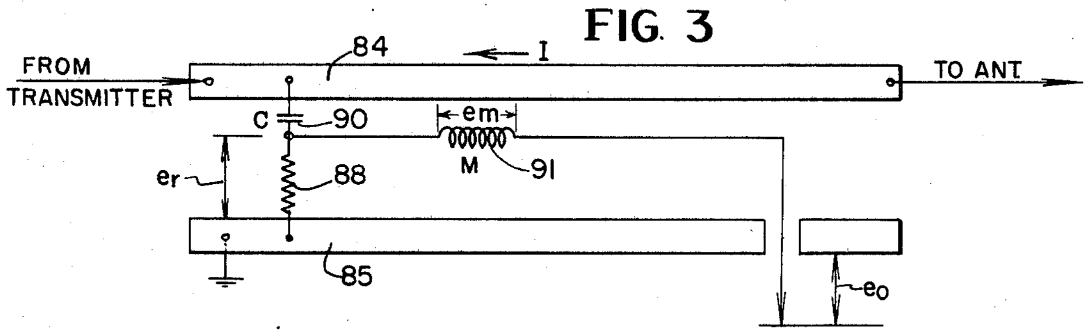
FIG. 3 is the equivalent circuit of the directional coupler of FIG. 2.

FIG. 3 is the equivalent circuit of the directional coupler structure shown in FIG. 2. The electric coupling between conductors 84 and 86 of FIG. 2 is represented by capacitor 90 with a capacitance C. The magnetic coupling between conductors 84 and 86 of FIG. 2 is represented by inductance 91 which has an inductance M. The output voltage $e_o$ is the control signal applied to the protection circuit of FIG. 1.

The output voltage $e_o$ is the sum of two induced voltages $e_R$ and $e_M$.

$$e_o = e_R + e_M \tag{1}$$

If the resistance R of resistor 88 is very much less than $X_C$, $$e_R \approx E\frac{R}{X_C} = ER\cdot J\omega C \tag{2}$$

and $$e_M = I\cdot j\omega(\pm M) \tag{3}$$

where E is the voltage between the RF power line and the ground plane and I is the current in the RF power line with the direction of I shown in FIG. 3 being the direction of a reflected wave. Substitution of (2) and (3) in (1) yields $$e_o = J\omega(CRE \pm MI) \tag{4}$$

Since $Z_o$, the characteristic impedance of the transmission line, C and M are determined once the directional coupler is constructed the only remaining variable is R. If R is chosen so that $$R = \frac{M}{CZ_o} \tag{5}$$

the RF output voltage from the sampling line, $e_o$, will be directional and be proportional to the reflected wave. Substitution of (5) in (4) yields $$e_o = j\omega M\left(\frac{E}{Z_o} \pm I\right) \tag{6}$$

At any given point on a transmission line the voltage E is the sum of the forward and reflected voltages $E_f$ and $E_r$. The current I is:

$$I = \frac{E_f - E_r}{Z_o} \tag{7}$$

$$E = E_f + E_r \tag{8}$$

With the arrangement as shown in FIG. 3, the reflected wave corresponds to a negative sign for I in Equation 6. Therefore, $$e_o = j\omega M\left(\frac{E}{Z_o} - I\right) \tag{9}$$

$$e_o = j\omega M\left[\frac{E_f + E_r}{Z_o} - \frac{E_f - E_r}{Z_o}\right]$$

or $$e_o = \frac{j\omega M}{Z_o}(2E_r) \tag{10}$$

As can be seen from Equation 10 $e_o$ is directional and is proportional to the reflected wave $E_r$. $e_o$ is also directly proportional to frequency. In order to make $e_o$ frequency independent, the line coupling $e_o$ to transistor 71 is terminated in a capacitive reactance, shown as capacitor 93 in FIG. 1. The reactance of capacitance 93 is inversely proportional to the frequency and counteracts the frequency dependency of the directional coupler.

Figure 4:
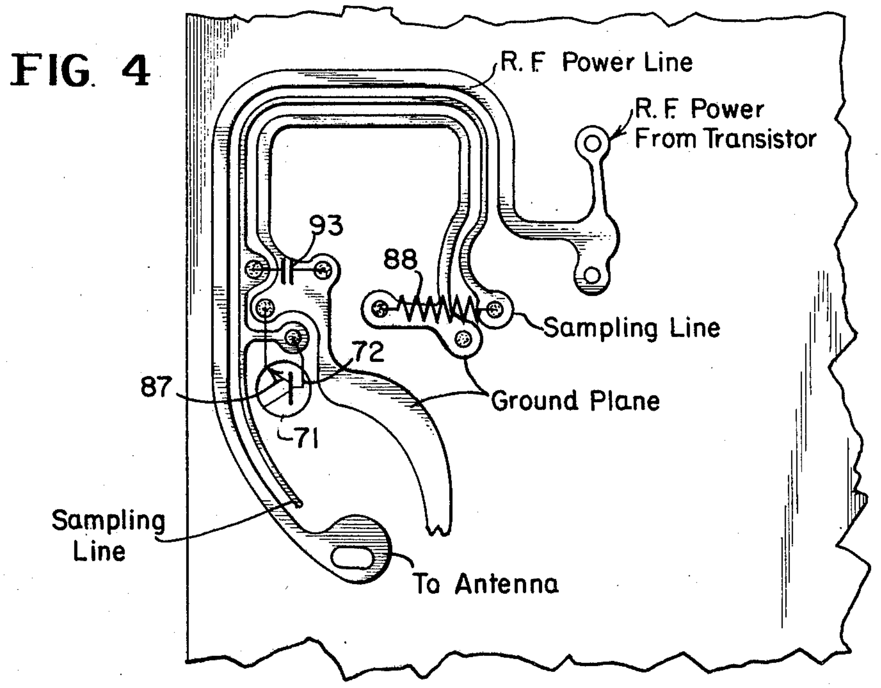
FIG. 4 is a drawing of a printed circuit board configuration of the directional coupler of FIG. 2.

In FIG. 4 there is shown a portion of a printed circuit board upon which is formed the directional coupler structure shown in FIG. 2. Only the printed circuit structure forming the directional coupler is shown in FIG. 4 and portions of the board pertaining to other parts of the circuitry of the transmitter have been omitted in order that the directional coupler structure may be more clearly shown.

RF energy from power amplifier 29 of FIG. 1 is coupled to RF power line 84 of FIG. 4. The antenna 34 of FIG. 1 is coupled to the other end of RF power line 84 through antenna switch 32. Ground plane 85 is positioned at a substantially constant interval from a portion of RF power line 84. Sampling line 86 is positioned between RF power line 84 and ground plane 85 and is approximately equidistant between the ground plane and the sampling line.

Resistor 88 is connected between sampling line 86 and the ground plane 85. The termination capacitor 93 of FIG. 1 is also coupled between sampling line 86 and ground plane 85. Base 72 of transistor 71 is coupled to the sampling line and emitter 87 of transistor 71 is connected to ground plane 85. Transistor 71 is shown displaced in FIG. 4 in order to more clearly show the printed circuit structure. The connection of the collector of transistor 71 is not shown in FIG. 4.

Thus an improved protection circuit has been shown. The protection circuit is responsive to reflected power above a predetermined magnitude to alternately connect and disconnect the power supply to a transmitted amplifier in order to remove the drive signal from the transmitter output transistor and thus prevent damage to output transistors. The alternate action of coupling and uncoupling the power supply to the amplifier is carried out at a slow rate and the protection circuit acts to develop a pulse signal. These pulses are coupled to an audio stage and are reproduced as an audible alarm signal to alert the operator of the transmitter that a fault has occurred requiring the operation of the transistor protection circuit.

We claim:

1. A transistor protection system for use in a transmitter, including in combination, amplifier means, output circuit means coupled to said amplifier means and including at least one output transistor, detection means coupled to said output circuit means and responsive to a condition in said output circuit means which causes excessive current to flow through said output transistor to develop a control signal, a power supply, a protection circuit coupling said power supply to said amplifier means for applying operating potential from said power supply to said amplifier means, said protection circuit further being coupled to said detection means for receiving said control signal, said protection circuit being responsive to said control signal above a predetermined magnitude to control the operating potential applied by said power supply to said amplifier means and further including means acting in response to said control signal above said predetermined magnitude to develop an alarm signal, and audio circuit means coupled to said protection circuit and responsive to said alarm signal to develop an audible signal indicating operation of said protection circuit.

2. The transistor protection system of claim 1 wherein, said protection circuit includes bias circuit means coupled to said detection means and said power supply, said protection circuit further including first transistor means having a first electrode coupled to said bias circuit means, a second electrode coupled to said power supply and a third electrode coupled to said amplifier means, said bias circuit means including capacitance means and circuit means connected thereto for charging the same in response to a control signal above said predetermined magnitude, first resistance means coupled to said capacitance means to discharge the same, said bias circuit means normally biasing said first transistor means to a conductive state, said bias circuit means further being responsive to said charge on said capacitance means having a particular magnitude to render said first transistor means non-conductive so that said power supply is disconnected from said amplifier means and the control signal ceases, said bias circuit means being responsive to a reduction of the charge on said capacitance means below the particular magnitude in response to cessation of the control signal to change the bias on said first transistor means whereby said first transistor mean is rendered conductive, the value of said capacitance means and said first resistance means being chosen whereby said first transistor means is biased alternately to non-conduction and conduction, said bias circuit means further including second resistance means coupled to said audio circuit means, and circuit means coupled to said second resistance means for applying current therethrough in response to charge of said capacitance means to the particular magnitude to develop said alarm signal across said second resistance means.

3. The transistor protection system of claim 2 wherein, said bias circuit means includes a second transistor having a first electrode coupled to said detection means, a second electrode coupled to said capacitance means and a third electrode connected to a reference potential, said second transistor being responsive to said control signal above said predetermined magnitude to become conductive and complete a circuit path to said capacitance means to charge the same above said particular magnitude, whereby said first transistor means is biased to non-conduction, said second transistor being responsive to said cessation of said control signal to become non-conductive whereby said capacitance means discharges through said first resistance means.

4. The transistor protection circuit of claim 2 wherein, the values of said capacitance means and said first resistance means are chosen whereby said first transistor means is biased alternately to non-conduction and conduction at a rate less than 200 cycles per second.

5. A transistor protection system for use in a transmitter, including in combination, amplifier means, output circuit means coupled to said amplifier means and including at least one output transistor, detection means coupled to said output circuit means and responsive to reflected power in said output circuit means above a predetermined magnitude to develop a control signal, a power supply, a protection circuit coupling said power supply to said amplifier means for applying energizing potential from said power supply to said amplifier means, said protection circuit further being coupled to said detection means for receiving said control signal, said protection circuit being responsive to said control signal to disconnect said power supply from said amplifier means and thereby render said amplifier means inoperative, said protection circuit further including means acting in response to said control signal above said predetermined magnitude to develop an alarm signal, and audio circuit means coupled to said protection circuit and responsive to said alarm signal to develop an audible signal indicating operation of said protection circuit to render said amplifier means inoperative.

6. The transistor protection system of claim 5 wherein, said detection means includes a directional coupler coupled to said output circuit means and responsive to said reflected power to develop said control signal, and said protection circuit is coupled to said directional coupler and is responsive to said control signal.

7. The transistor protection system of claim 6 wherein, said protection circuit includes bias circuit means coupled to said directional coupler and said power supply, said protection circuit further including first transistor means having a first electrode coupled to said bias circuit means, a second electrode coupled to said power supply and a third electrode coupled to said amplifier means, said bias circuit means including capacitance means and circuit means connected thereto for charging the same in response to a control signal above said predetermined magnitude, first resistance means coupled to said capacitance means to discharge the same, said bias circuit means normally biasing said first transistor means to a conductive state, said bias circuit means further being responsive to said charge on said capacitance means having a particular magnitude to change the bias on said first transistor means whereby said first transistor means is rendered non-conductive so that the said amplifier means is inoperative and said control signal ceases, said bias circuit means being responsive to said cessation of said control signal to discharge said capacitance means through said first resistance means, said bias circuit means being responsive to a reduction of the charge on said capacitance means below a particular magnitude to change the bias on said first transistor means whereby said first transistor means is rendered conductive, the values of said capacitance means and said first resistance means being chosen whereby said first transistor means is biased alternately to nonconduction and conduction, said bias circuit means further including second resistance means coupled to said audio circuit means, and circuit means coupled to said second resistance means for applying current therethrough during the periods that said first transistor means is nonconductive to develop said alarm signal across said second resistance means.

8. The transistor protection system of claim 7 wherein, said bias circuit means includes a second transistor having a first electrode coupled to said directional coupler, a second electrode coupled to said capacitance means and a third electrode connected to a reference potential, said second transistor being responsive to said control signal above said predetermined magnitude to become conductive and complete a circuit path to said capacitance means to charge the same above said particular magnitude, whereby said first transistor means is biased to non-conduction, said second transistor being responsive to said cessation of said control signal to become non-conductive whereby said capacitance means discharges through said first resistance means.

9. The transistor protection system of claim 8 wherein said bias circuit means further includes a third transistor having a first electrode coupled to said second electrode of said second transistor, to said capacitance means and to a first portion of said first resistance means, a second electrode coupled to a second portion of said first resistance means and a third electrode coupled to said second resistance means, conduction of said second transistor causing conduction of said third transistor and causing said capacitance means to charge above said particular magnitude to maintain said third transistor in a conductive state for a given time period during which said capacitance means discharges through said first portion of said first resistance means and through said third transistor means and said second portion of said first resistance means, said third transistor in a conductive state acting to increase the flow of current through said second portion of said first resistance means to bias said first transistor to non-conduction and causing current flow through said second resistance means to develop said alarm signal.

10. The transistor protection system of claim 6 wherein said directional coupler includes an RF power line having one end coupled to said output transistor, a ground plane extending along a portion of said RF power line and spaced apart therefrom, a sampling line positioned between said RF power line and said ground plane and spaced substantially equidistant from each, resistance means connecting one end of said sampling line to said ground plane, and coupling circuit means connecting said sampling line to said protection circuit.

11. The transistor protection system of claim 10 wherein, said RF power line, said ground plane and said sampling line are formed on a printed circuit board, said protection circuit including an input transistor having a first electrode coupled to said sampling line and a second electrode coupled to said ground plane, said directional coupler further including capacitor means connected between said sampling line and said ground plane.

References Cited

UNITED STATES PATENTS

| | | | |
|---|---|---|---|
| 3,238,475 | 3/1966 | DeVita et al. | 325—150 X |
| 3,323,065 | 5/1967 | O'Connor | 325—151 |
| 3,345,570 | 10/1967 | Matyckas | 325—150 |

NATHAN KAUFMAN, Primary Examiner

U.S. Cl. X.R.

330—117, 22